United States Patent [19]

Wang et al.

[11] Patent Number: 6,128,715
[45] Date of Patent: *Oct. 3, 2000

[54] ASYNCHRONOUS TRANSMIT PACKET BUFFER

[75] Inventors: Chi-Lie Wang; Ngo Thanh Ho, both of San Jose, Calif.

[73] Assignee: 3Com Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/866,822

[22] Filed: May 30, 1997

[51] Int. Cl.$^7$ ....................................... G06F 12/00
[52] U.S. Cl. .............................. 711/168; 710/61; 711/150
[58] Field of Search .................................... 711/149, 150, 711/168; 395/200.8, 200.61, 200.62, 200.64, 849, 855, 876, 873; 709/231, 232, 233, 234, 250; 710/29, 35, 53, 56, 61

[56] References Cited

U.S. PATENT DOCUMENTS

| | | | |
|---|---|---|---|
| 5,384,744 | 1/1995 | Lee | 365/221 |
| 5,541,930 | 7/1996 | Klingman | 370/524 |
| 5,651,002 | 7/1997 | Van Seters et al. | 370/392 |
| 5,732,094 | 3/1998 | Petersen et al. | 371/51.1 |
| 5,751,951 | 5/1998 | Osborne et al. | 709/250 |
| 5,805,816 | 9/1998 | Picazo, Jr. et al. | 395/200.53 |
| 5,811,995 | 9/1998 | Roy et al. | 327/99 |
| 5,815,501 | 9/1998 | Gaddis et al. | 370/402 |
| 5,944,804 | 8/1999 | Aditya et al. | 710/106 |

*Primary Examiner*—Do Hyun Yoo
*Assistant Examiner*—Gary J. Portka
*Attorney, Agent, or Firm*—Wilson, Sonsini, Goodrich & Rosati

[57] ABSTRACT

A transmit packet buffer device capable of asynchronous read and write functions is used for receiving frame data from a host and forwarding the data over a network. The device comprises dual-ported memory capable of independent write and read access, a plurality of registers for storing address pointers to locations in the memory, and a logic device coupled to the dual-ported memory and the plurality of registers for controlling downloading data into the memory at a first clock speed, and transmitting data from the memory at a second clock speed. The registers are used to store memory addresses for reference by the logic device, and the data is divided into frames.

17 Claims, 5 Drawing Sheets

ASYNCHRONOUS TRANSMIT PACKET BUFFER

BACKGROUND OF THE INVENTION

The field of the present invention relates to data communication systems. In particular, the field of the invention relates to a transmit packet buffer which is used to store and transmit data packets or frames which are downloaded from a host memory through a direct memory access (DMA) data transfer and subsequently transmitted onto a network. A dual ported memory enables independent write and read operations. Multiple data packets are queued into the transmit packet buffer and sequentially read out for transmission. Packets can be written into the transmit packet buffer asynchronously with respect to the read operation.

Conventional long distance computer communication networks are based on synchronous bit stream links implemented to support digital telephony channels. However, most intercomputer communication is characterized by a sudden burst of data, involving the exchange of blocks of memory or characters between terminals and CPUs. In order to overcome the requirements to support constant bit rate data traffic, local area networks (LANs) have been optimized for the transmission of data in bursts or packets.

LANs are based on sharing a single physical cable, with no particular synchronization between attached nodes. When a node has a packet to transmit, it attempts to do so provided the medium is not already being used. Packet lengths must be limited to bound the time a node may continuously control a channel. The lack of fixed time slots to implicitly identify a frame's source and destination node requires packets to contain additional bit patterns or address fields to perform this function.

When a communication medium is idle between packets, each transmission includes a sufficient preamble for all attached receivers to resynchronize for the duration of the packet. Only one transmission can occur at a time, since two nodes simultaneously transmitting a packet would cause a collision. In order to overcome this problem, LANs use explicit means to share a communication medium, such as deterministic multiplexing, which prevents collisions from occurring. Other LAN designs rely upon the fact that sources normally transmit data in uncorrelated bursts. Such LANs employ collision recovery mechanisms and rely on statistical multiplexing for communication of data.

A transmit packet buffer is used to interface a host system to a LAN. The transmit packet buffer stores data downloaded from a host to be transmitted over the LAN. The buffer allows data to be downloaded from the host when convenient for the host and subsequently transmitted to the network when convenient for the network increasing the efficiency of the host network system. Furthermore, the host can not directly transmit data to the network because the host clock is not synchronized with the network clock.

One conventional approach is to download data under the host clock domain from the host into a first burst cache. Once the first burst cache has been filled the data can be downloaded under the network clock domain to the transmit packet buffer memory. While the data is being downloaded from the first burst cache, data can start being downloaded from the host to fill a second burst cache. Upon filling the second burst cache the data from the second burst cache is downloaded under the network clock domain to the transmit packet buffer memory. The first and second burst caches are swapped back and forth interrupting the continuous transfer of data from the host. Under this system reading and writing to the same memory or cache under different clock domains will not occur and data synchronization errors are thus avoided.

What is needed is system that will support unlimited burst transfer size from the host, allowing data to be downloaded uninterrupted to the transmit packet buffer. Such a system would increase efficiency of the host, speeding up the transfer of data to the transmit packet buffer and network.

In addition conventional systems typically include a packet header indicating information about the packet including the length of the packet. Specifying the length of the packet in the header requires that the host completely finish constructing the packet before it can be downloaded.

What is needed is a system that supports cut through capability allowing downloading of a data packet from the host to begin before the host has finished constructing the data packet. Cut through capability minimizes latency, increasing the performance of the system.

What is also needed is a system capable of supporting packets of large sizes, possibly larger than the size of the buffer memory. Such capability increases the flexibility of the device insuring that it will not be obsolete if standard packet sizes are increased.

Additionally what is needed is a system which can continuously reclaim buffer memory for new data storage as data is transmitted to the network, rather than reclaiming the memory taken up by the entire packet after transmission of the packet is complete. Continuous reclaim of buffer memory effectively increases the buffer memory size, allowing a smaller and less expensive memory array to be used without sacrificing system performance.

SUMMARY OF THE INVENTION

An aspect of the invention is directed to a system that satisfies the need for an enhanced transmit packet buffer device capable of supporting automatic reclaim of buffer memory space, unlimited burst transfer size, large packet transmission and cut through capability. A transmit packet buffer device capable of asynchronous read and write function is used for receiving frame data from a host and forwarding the data over a network. The device comprises dual-ported memory capable of independent write and read access, a plurality of registers for storing address pointers to locations in the memory, and a logic device coupled to the dual-ported memory and the plurality of registers for controlling downloading data into the memory at a first clock speed, and transmitting data from the memory at a second clock speed. The registers are used to store memory addresses for reference by the logic device, and the data is divided into frames.

The logic device comprises a host side interface, a network side interface and a synchronization interface. The host side interface controls downloading data from the host and writing data to the dual ported memory at a host clock speed. The network side interface controls reading data from the dual ported memory and transmitting data over the network at a network clock speed. And, the synchronization interface controls the synchronization of data such that data can be written and read under the different clock domains simultaneously without introducing errors.

Space in the buffer memory is automatically reclaimed after the data contained therein is transmitted over the network. Reclaimed buffer memory space is free for storage of new data from the host. Reclaim of buffer memory containing transmitted data from a data frame begins after a first portion of the frame has been successfully transmitted over the network. The size of the first portion is chosen to be large enough that notification of a data collision on the network will be received before the first portion has been completely transmitted. After successful transmission of the first portion, the buffer memory containing the first portion is reclaimed. The buffer memory containing the rest of the frame is continuously reclaimed as the frame data is transmitted over the network. If a data collision is detected during transmission of the first portion, no data for that frame will have been reclaimed and retransmission of the frame can be initiated.

The dual ported memory allows data to be downloaded from the host and written to the memory by the host side interface at the same time data is being read from the memory and transmitted over the network by the network side interface. Thus continuous transfers of data from the host can occur of unlimited size (unlimited burst transfer size) so long as transmission of data over the network is proceeding quickly enough to free up necessary space in the memory for the downloaded host data. Unlimited burst transfer size reduces wait time and increases efficiency for the host network system.

Large frame support is also implemented in the present invention. Large frames are frames with a size greater than the size of the buffer memory. Support for large frame sizes is possible because transmission of frame data to the network does not wait for the entire frame to be downloaded into the buffer memory. Since reclaim of buffer memory occurs after a first portion of a frame has been successfully transmitted over the network, large frames can be continuously downloaded into the buffer memory writing over the reclaimed memory storing the earlier portions of the frame. The ability to support large frame sizes adds considerable flexibility to the transmit packet buffer device of the present invention and insures that a change in standard frame size will not render a smaller buffer memory size device obsolete.

Cut through capability refers to the ability of the transmit packet buffer device of the present invention to begin downloading a frame from the host before the host has finished constructing the entire frame. This is possible because the transmit packet buffer device does not need to know in advance the size of the frame. Thus the beginning of the frame can be downloaded while the end of the frame is still being constructed, reducing latency and improving efficiency of the entire host network system.

These and other features, aspects, and advantages of the present invention will become better understood with regard to the following description, appended claims, and accompanying drawings where:

DETAILED DESCRIPTION

Overview

Figure 1:
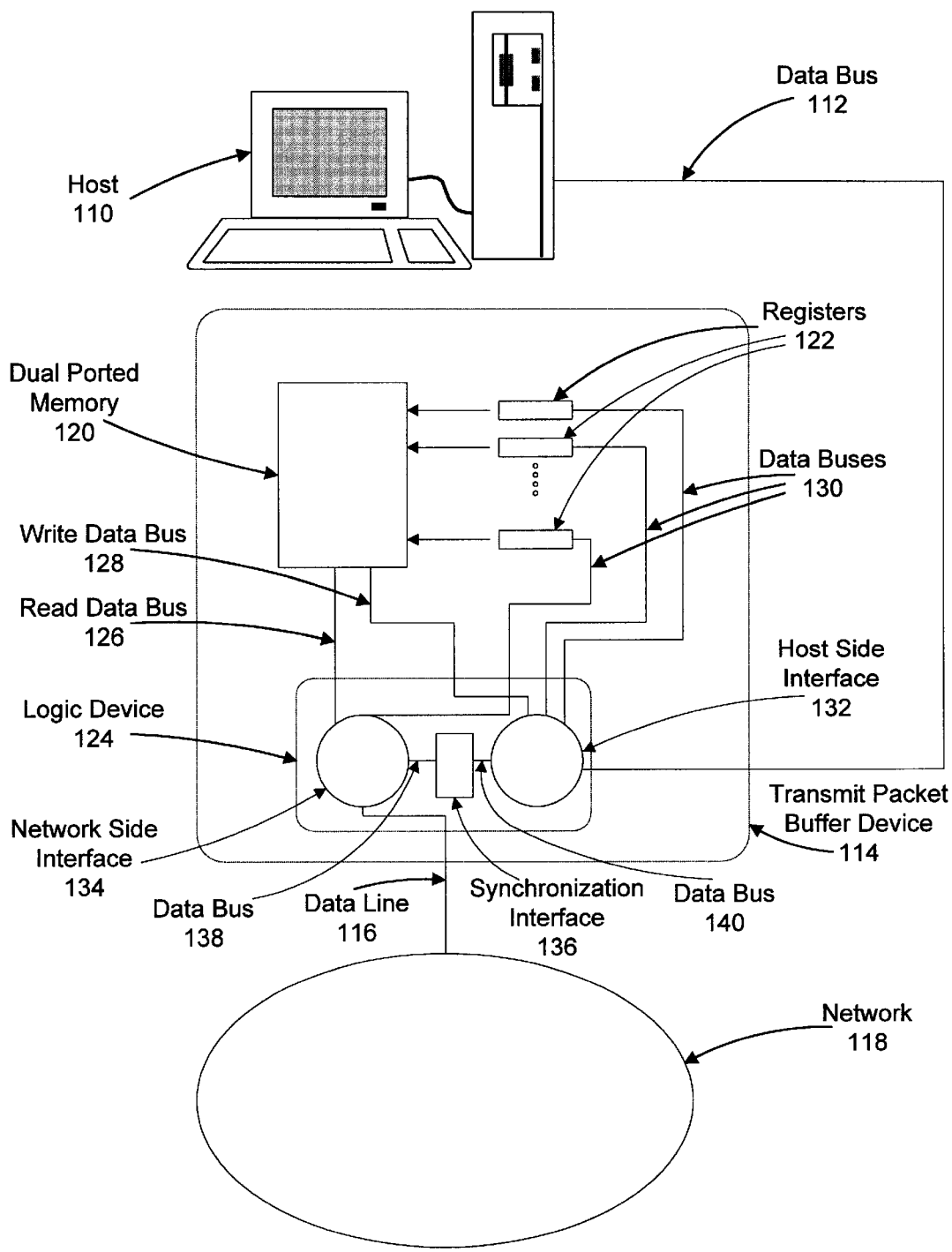
FIG. 1 is a schematic diagram of an embodiment of the present invention.

Referring to FIG. 1, a host 110 which can be a computer, terminal or other device capable of network communication is coupled by data bus 112, which can be a PCI, EISA, ISA, or other type of data bus, to transmit packet buffer device 114, discussed in detail below. Data is downloaded from host 110 through Direct Memory Access and transmitted over data bus 112 to transmit packet buffer device 114. Transmit packet buffer device 114 transmits data over data line 116 to network 118, which can be an Ethernet, Token Ring, FDDI or other packet based network. Network 118 is typically an Ethernet network but can be any type of frame or packet based network system.

Transmit packet buffer device 114 includes dual ported memory 120, registers 122 and logic device 124. Dual ported memory 120 is connected by two separate data busses, read data bus 126 and write data bus 128 to logic device 124. Read data bus 126 is used to transfer data from memory 120 to logic device 124 for transmission over network 118. A first clock, which can be an application specific integrated circuit (ASIC) clock, is synchronized to network 118 and governs the reading of memory 120 over read data bus 126. Write data bus 128 is used to transfer data downloaded from host 110 to dual ported memory 120. A second clock which can be a pci clock, is synchronized to the host 110 and governs writing of data to memory 120 over write data bus 128.

Multiple data bus connections allow memory 120 to support simultaneous read and write operations to maximize efficiency of host 110 and network 118. Since memory 120 allows independent read and write capability, host 110 and network 118 do not compete for access to memory 120. Additionally, read and write access to memory 120 is asynchronous. Asynchronous read and write refers to the capability to download data from host 110 and write to memory 120 at one clock speed while data is read from the memory 120 and transmitted to network 118 at a different clock speed. The asynchronous read and write capability of memory 120 allows transmit packet buffer device 114 to download and store data from host 110 at a speed governed by the pci or host clock, while reading data from memory 120 and transmitting data to network 118 at a speed governed by the ASIC or network clock.

Registers 122 are connected to logic device 124 by data busses 130 and provide data storage for data used by logic device 124 for controlling data flow through transmit packet buffer device 114. Typically registers 122 store address pointers to locations in memory 120, counters for keeping track of data transmitted or received and conditional flags for identifying the state of memory 120, e.g. a buffer full flag to indicate when the buffer memory is full. Registers may be used to store other types of data and additional registers may be contained within logic device 124.

Logic device 124 controls the downloading of data from host 110, storage of data in memory 120 and the transmission of data over network 118. Logic device 124 contains host side interface 132 and network side interface 134. Host side interface 132 controls downloading of data from host 110 through data bus 112 and writing of data to memory 120 through write data bus 128. Host side interface 132 runs on the pci clock so that no synchronization is necessary for data transfers between host 110 and host side interface 132.

Similarly network side interface 134 controls reading of memory 120 through read data bus 126 and transmitting of data through data line 116 to network 118. Network side interface 134 runs on the ASIC clock so that no synchronization is necessary for data transfers between network side interface 134 and network 118.

Logic device 124 also contains synchronization interface 136 which controls the synchronization of host side interface data received through data bus 140 and network side interface data received through data bus 138. Because host side interface 132 and network side interface 134 run on different clocks, synchronization of address pointers used to derive various conditions, such as the buffer full condition, is necessary in order to avoid errors when the pointers are being read and written simultaneously under the different clock domains.

Logic device 124 is typically contained as all or part of an application specific integrated circuit (ASIC). However the control logic can also be programmed, the program being executed by a microprocessor, computer or the like. The control logic is described in detail below. Methods for programming logical operations using computers or integrated circuits are well known in the art.

Data Structures

Figure 2:
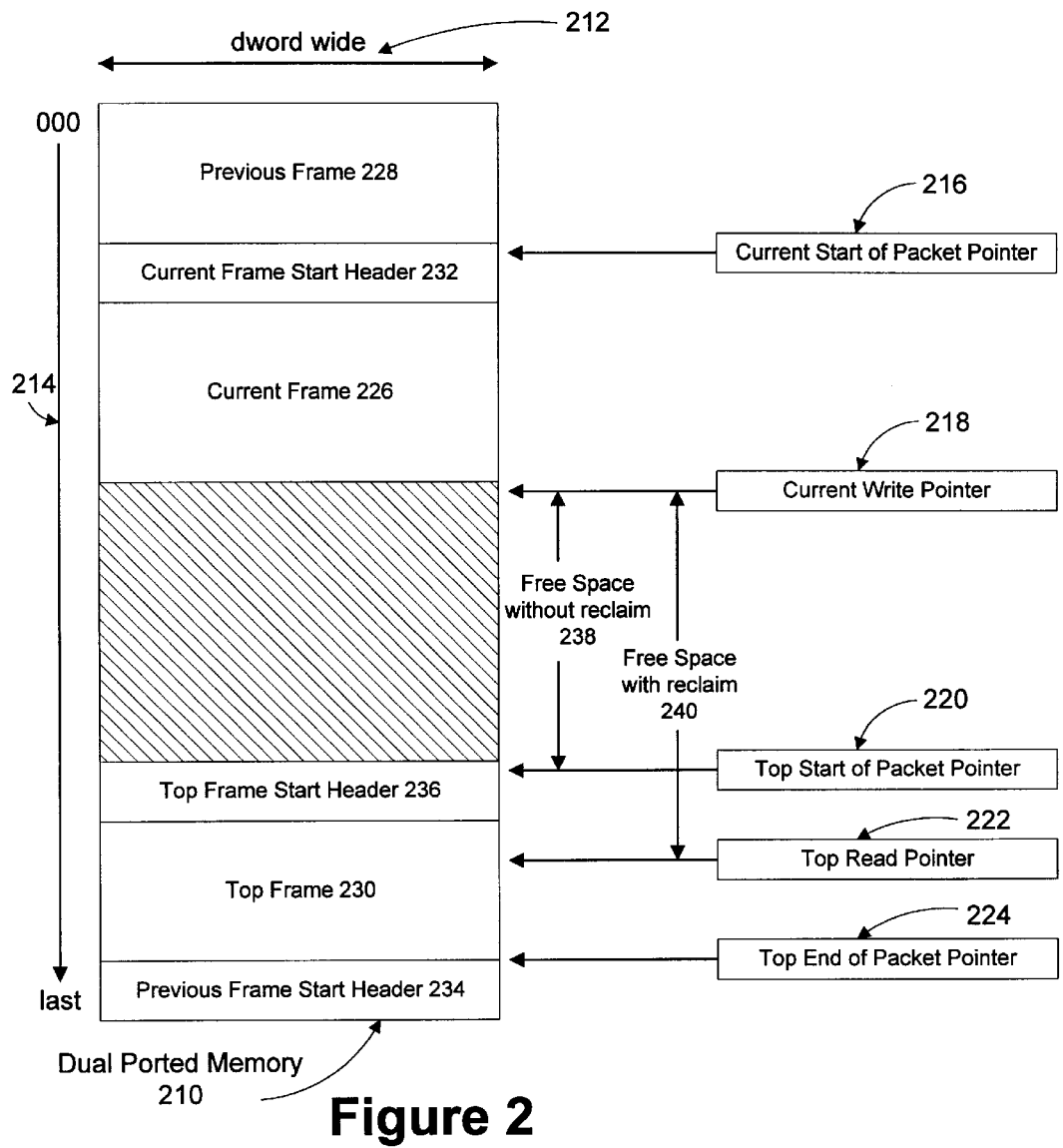
FIG. 2 is a schematic diagram of a state of memory in accord with an embodiment of the present invention.

Referring to FIG. 2, dual ported memory 210 is shown schematically. Memory 210 consists of $2_n$ bytes, divided into $2_{n-2}$ four byte dwords. The width 212 of memory 210 in FIG. 2 represents one dword or four bytes, while the length 214 represents a series of addresses each referring to one dword. Dword addresses have n–2 bits allowing each of the 2n–2 dwords in memory 210 to be uniquely addressed. Similarly, byte addresses have n bits allowing each of the $2_n$ bytes in memory 210 to be uniquely addressed.

The size n of memory 210 is chosen to optimize performance of the transmit packet buffer device without unduly raising the manufacturing cost. A large memory size reduces latency for both the host and network, by minimizing the possibility of the memory becoming completely full or empty. A large memory size allows data to be downloaded from the host when convenient for the host and transmitted over the network when convenient for the network, increasing efficiency of the entire host network system. However, large memory arrays increase the cost of manufacturing the transmit packet buffer device. Therefore a memory size is chosen which is sufficiently large that data can be continuously downloaded from the host and stored in the memory for a length of time of about a reasonable wait time for gaining access to transmit over the network. Thus in most cases, transmission of data from the transmit packet buffer device will begin before the host can completely fill the memory with data to be transmitted. The transmission of data will free up space in the memory allowing more data to be downloaded from the host.

For a one hundred megabit Ethernet network such a reasonable wait time could be about one millisecond or less, thus requiring a memory size of multiple kilobytes. Furthermore, since data is typically divided into packets or frames with each frame being transmitted continuously over the network, the memory size is chosen to be large enough to contain multiple frames. Frame sizes are variable; however, they typically do not exceed one and a half kilobytes, therefore a reasonable memory size for the present invention is about two kilobytes. A larger memory size can be implemented and may be desirable, for example, if data is being transmitted at a faster rate, larger data frame sizes are to be used or the cost of producing memory is reduced.

Figure 3:
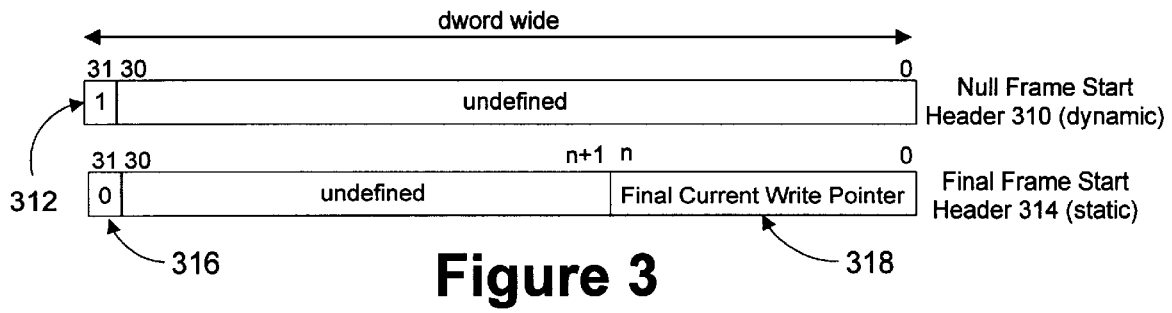
FIG. 3 is a schematic diagram of a null and a final frame start header in accord with the present invention.

All frames start on a dword boundary with the frame start header followed with any number of transmit data and necessary pad bytes to fill the last dword. Before a new frame is downloaded into memory 120 from host 110, a null frame start header 310, shown in FIG. 3, is written into the next available dword in memory 210. Null frame start header 310 is one dword, thirty two bits, in length and contains a status flag 312 as the last bit. Null frame start header 310 has status flag 312 set to one to indicate a frame which is currently being downloaded into memory, referred to as a dynamic frame. The remaining thirty one bits of null frame start header 310 are undefined.

Upon completely downloading a frame, null frame start header 310 is overwritten by final frame start header 314. Status flag 316 in final frame start header 314 is set to zero to indicate a frame which has been completely downloaded to memory 120, referred to as a static frame. Final current write pointer 318 is stored in bits zero through n in final frame start header 314. Final current write pointer 318 is loaded with the value of current write pointer 218 (discussed below) and contains the address of the next byte after the end of the downloaded frame. Bits n+1 through thirty of final frame start header 314 are undefined.

Referring again to FIG. 2, an example of a state of memory 210 during operation of the transmit packet buffer device is illustrated. Three data frames are fully or partially stored in memory 210, current Frame 226, which is the frame currently being written to memory 210, previous frame 228, which is the frame previously written to memory 210 and top frame 230, which is the frame currently being read from memory 210. Each frame is preceded by a one dword frame start header. Thus current frame start header 232 precedes current frame 226, previous frame start header 234 precedes previous frame 228 and top frame start header 236 precedes top frame 230.

Five address pointers 216, 218, 220, 222 and 224 are used by the logic device 124 to keep track of current writing and reading operations to and from memory 210. Pointers 216, 218, 220, 222 and 224 are stored in registers 122 coupled by data lines 130 to the logic device 124. Each pointer contains either a byte or dword address and an extra bit which is toggled when the pointer is moved from last to the first address or from the first to the last address in memory 120.

Current start of packet pointer 216 and current write pointer 218 are used to keep track of writing operations and are controlled by the host side interface 132 which runs on the pci clock. Current start of packet pointer 216 contains a dword address pointing to the location of current frame start header 230, while current write pointer 218 contains a byte address pointing to the location into which the next data from host 110 will be written i.e. the next free byte in memory 120.

Top start of packet pointer 220, top read pointer 222 and top end of packet pointer 224 are used to keep track of reading operations and are controlled by the network side interface 134 which runs on the ASIC clock. Top start of packet pointer 220 contains a dword address pointing to the location of the first data of top frame 230. The first data of top frame 230 will always lie on a dword boundary since the frame start header is one dword long and is always placed at a dword boundary. Top read pointer 222 contains a byte address pointing to the location of the next data byte to be read and transmitted over network 118, while the top end of packet pointer 224 contains a byte address pointing to the location of the first byte after the last byte of valid data of top frame 230. A summary of the five pointers is found in Table 1 bellow:

TABLE 1

| POINTER | TYPE | CLOCK | LOCATION POINTED TO |
|---|---|---|---|
| current start of packet | dword | pci | frame start header of current frame |
| current write | byte | pci | next available byte for writing data |
| top start of packet | dword | ASIC | first data of the top packet |
| top read | byte | ASIC | next byte to be read |
| top end of packet | byte | ASIC | first byte after the last byte of valid data of the top packet |

Current write pointer 218 points to the first byte of free space 236 and 240. The position of the last byte of free space, however, depends on whether the portion of memory 120 containing transmitted data of top frame 230 has been reclaimed for writing new data.

The process of reclaiming memory is complicated by the possibility of the need for data retransmission because of data collisions on the network. A collision occurs when two separate network end stations attempt to transmit over the network at the same time. Because of the finite speed of the transmission, a first end station is not immediately aware that a second end station has begun transmitting over the network. If the first endstation attempts to transmit during the delay time before the second end station signal is detected, a collision will result and both endstations must retransmit their respective data. The maximum time for a collision to be detected is determined by the round trip transit time of data to travel across the network.

Because of the possibility of network collisions memory used by transmitted frame data can not be reclaimed until enough data has been transmitted to allow reasonable assurance that a collision will not occur. In the present invention the number of bytes transmitted in top frame 230 is tracked by a transmit count value stored in a transmit count register. When the transmit count value exceeds a reclaim threshold value set in a reclaim threshold register, transmitted data of top frame 230 is reclaimed.

Before the transmit count value exceeds the reclaim threshold value there is no reclaim and the available free space in memory 120 is free space without reclaim 238 between current write pointer 218 and top start of packet pointer 220. After the transmit count value exceeds the reclaim threshold value there is reclaim and the available free space is free space with reclaim 240 between current write pointer 218 and top read pointer 222. Once the reclaim threshold value has been exceeded by the transmit count value, memory is continuously reclaimed as top read pointer 222 is incremented. Continuous reclaim continues until transmission of a new frame begins and the transmit count value is reset.

On a typical local area network a reclaim threshold value of sixty four bytes or more is sufficient to reasonably assure that a collision will not occur after reclaim has started. The reclaim threshold value, however, is dependent on the size of the network and can safely be set lower than sixty four bytes in some cases.

The Host Side Interface and Write Operation

Host side interface 132 is part of the logic device 124 and controls downloading of data from host 110 and writing of data to memory 120 of transmit packet buffer device 114. Host side interface 132 runs on the pci clock which is synchronized to host 110, allowing data to be downloaded from host 110 through direct memory access. There are two basic write operations performed by host side interface 132, one for writing the frame start header, and another for writing the frame data.

Figure 4:
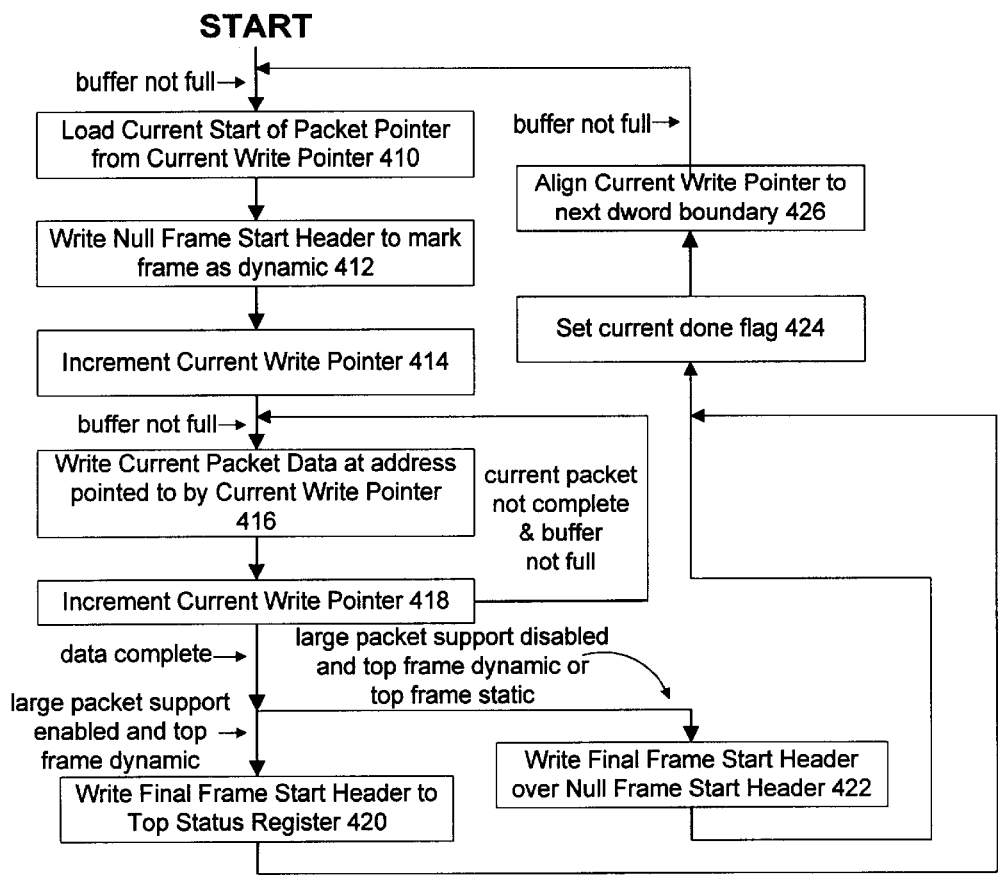
FIG. 4 is a flow chart illustrating the write operation of a transmit packet buffer device in accord with an embodiment of the present invention.

The process of downloading a frame from host 110 and writing it to the memory 120 of transmit packet buffer 114 device is described in FIG. 4. If at any point in the process buffer memory 120 becomes full as indicated by the buffer full flag discussed below, host side interface 132 must wait for a portion of memory 120 to be reclaimed before writing to memory 120 can continue. To download a frame, host side interface 132 first loads current start of packet pointer 216 with current write pointer 218, step 410. This stores the address of the start of the frame in current start of packet pointer 216 so that final frame start header 314 can later be written. Next, null frame start header 310 is written to memory 120, step 412, marking the current frame as dynamic. Then current write pointer 218 is incremented four bytes, step 414, so that it points to the next byte after the null frame start header 310.

Next, the first byte of current frame data is written to the address pointed to by the current write pointer 218, step 416. Then current write pointer 218 is incremented to the next byte in buffer memory 120, step 418. If the frame data is not complete, as indicated by a data complete signal received from host 110, and buffer memory 120 is not full, the next byte of current frame data is written to the address pointed to by the current write pointer 218, step 416, and the current write pointer 218 is again incremented to point to the next byte in buffer memory 120, step 418. Steps 416 and 418 are repeated until all of the current frame data has been downloaded from host 110.

After downloading the last byte of the frame from host 110, a data complete signal is received from host 110 to indicate that the frame has been completely downloaded. If large frame support is disabled i.e. frames downloaded are assumed to be always smaller than the buffer memory size, or if top frame 230 is static, null frame start header 310 pointed to by the current start of packet pointer 216 is overwritten with a final frame start header 314, step 422. Final frame start header 314 contains final current write pointer 318, marking the end of the frame, and a status flag 316, identifying the frame as static.

Next, a current done flag is set, step 424 to indicate to network side interface 134 that current frame 226 has been completely downloaded. If the network side interface 134 is currently reading out a dynamic frame, setting the current done flag will cause the top frame to be marked static in the top status register and the top end of packet pointer to be fixed with the current address of the current write pointer 218, marking the end of the newly downloaded frame. The top status register contains the top end of packet pointer and a top status bit, which indicates whether top frame 230 is static or dynamic.

If large frame support is enabled and the top frame is dynamic, final frame start header 314 is not written over null frame start header 310 since the memory space occupied by null frame start header 310 may have been reclaimed and written over by new data. In this case, the current done flag is set, step 424, to indicate to network side interface 134 that current frame 226 has been completely downloaded. As above, setting the current done flag will cause the top frame to be marked static in the top status register and the top end of packet pointer to be fixed with the current address of the current write pointer 218, marking the end of the newly downloaded frame.

The last step, in either case, is to align current write pointer 218 to the next dword boundary, step 426 to prepare to download the next frame. If the buffer memory 120 is not full, the process of downloading the next frame is then begun.

The Network Side Interface and Read Operation

Network side interface 134 is part of logic device 124 and controls reading of data from memory 120 and transmitting of the data over network 118. Network side interface 134 runs on the ASIC clock synchronized to network 118. Thus data can be directly transmitted over network 118 from network side interface 134.

Figure 5:
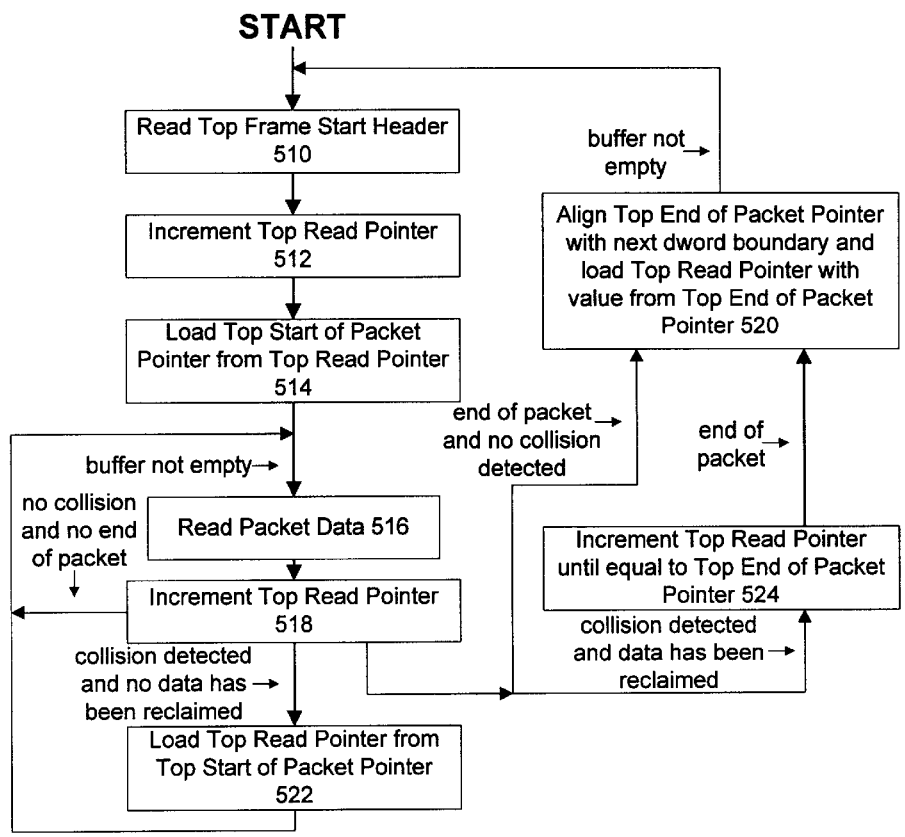
FIG. 5 is a flow chart illustrating the read operation of a transmit packet buffer device in accord with an embodiment of the present invention.

The frame transmit sequence controlling reading of frames from memory 120 and transmitting them over network 118 is described in FIG. 5. If at any point in the process the buffer memory becomes empty as indicated by the buffer empty flag discussed below, network side interface 134 must wait for new data to be stored in memory 120 by host side interface 132 before reading from memory 120 can continue. To read a frame from memory 120 and transmit it over network 118, network side interface 134 first reads top frame start header 236, step 510, which is pointed to by the top read pointer 222. Reading the frame start header has one of two effects depending on whether the status flag in the frame start header is set to indicate a static or a dynamic frame.

If the frame is static i.e. downloading from host 110 is complete, the top end of packet pointer 224 is loaded with the address of the end of the frame given by the final current write pointer 318 in final frame start header 314.

If the frame is dynamic i.e. downloading is still in progress, the top end of packet pointer 224 is constantly updated with current write pointer 218, since current write pointer 218 indicates where the frame data currently ends.

After reading the frame start header, step 510, top read pointer 222 is incremented four bytes, step 512, and top start of packet pointer 220 is loaded with the address from top read pointer 222, step 514. Thus top read pointer 222 points to the first data byte after the frame start header of the frame currently being read. Next the first byte of frame data is read, step 516, and transmitted over network 118, and top read pointer 222 is incremented one byte, step 518, to point to the next byte to be read. Steps 516 and 518 are repeated until either a collision is detected on network 118 or the end of frame flag, discussed below, is set to indicate the end of the frame has been reached. If the end of frame is reached with no network collision, top end of packet pointer 224 is aligned to the next dword boundary and top read pointer 222 is loaded with the value from top end of packet pointer 224, step 520. This sets top read pointer 222 to point to the frame start header of the next frame to be read. The frame transmit sequence is then started again with step 510.

If a network collision is detected network side interface 134 attempts to retransmit the frame. If memory space has not been reclaimed i.e. the transmit count value has not exceeded the reclaim threshold value then there is no danger that the transmitted data has been overwritten by host side interface 132. In this case, top read pointer 222 can be loaded with top start of packet pointer 220, step 522, and the frame data can be reread and retransmitted from the start of the frame by repeating steps 516 and 518 as above.

If, however, a network collision is detected and memory space has been reclaimed i.e. the transmit count value has exceeded the reclaim threshold value, then the reclaimed portion of top frame 230 may have been overwritten by host side interface 132. In this case top frame 230 is lost and a special flush mode is entered to align top read pointer 222 to read the next frame. This is accomplished by incrementing top read pointer 222 until it is equal to top end of packet pointer 224, step 524. Once the end of frame is reached as indicated by the end of frame flag, top end of packet pointer 224 is aligned to the next dword boundary and top read pointer 222 is loaded with top end of packet pointer 224, step 520. This sets top read pointer 222 to point to the frame start header of the next frame to be read and the frame transmit sequence is started again with step 510.

Buffer Empty Flag

The buffer empty flag is used to inform network side interface 134 when there is no more data in buffer memory 120 to be read and transmitted to network 118. When buffer memory 120 becomes empty the buffer empty flag is set to indicate an empty buffer memory. The buffer empty condition is computed by comparing bits two through n of top read pointer 222 to bits two through n of current write pointer 218. When bits two through n of top read pointer 222 are equal to bits two through n of current write pointer 218, the current write position is located on the same dword as the current read position, and the buffer empty flag is set to indicate an empty buffer memory 120. Bits two through n−1 of top read pointer 222 and current write pointer 218 identify a specific dword in memory 120 pointed to. Bit n is the extra bit which gives an indication of the number of times a pointer has wrapped around from the last memory address back to the first memory address. It is necessary to include bit n in the comparison for determining the buffer empty condition since simply knowing that top read pointer 222 and current write pointer 218 point to the same dword could indicate either that buffer memory 120 is empty or full. The condition of bit n is used to distinguish between a buffer full and a buffer empty condition. In order to have a buffer empty condition bit n of top read pointer 222 must be the same as bit n of current write pointer 218, indicating that both pointers have carried from the bottom to the top of memory 120 the same number of times.

Comparison of current write pointer 218 to top read pointer 222 is complicated by the fact that current write pointer 218 is based on the pci clock domain and top read pointer 222 is based on the ASIC clock domain. In order to avoid synchronization errors, it is necessary to convert current write pointer 218 to the ASIC clock domain before comparison with top read pointer 222.

Figure 6:
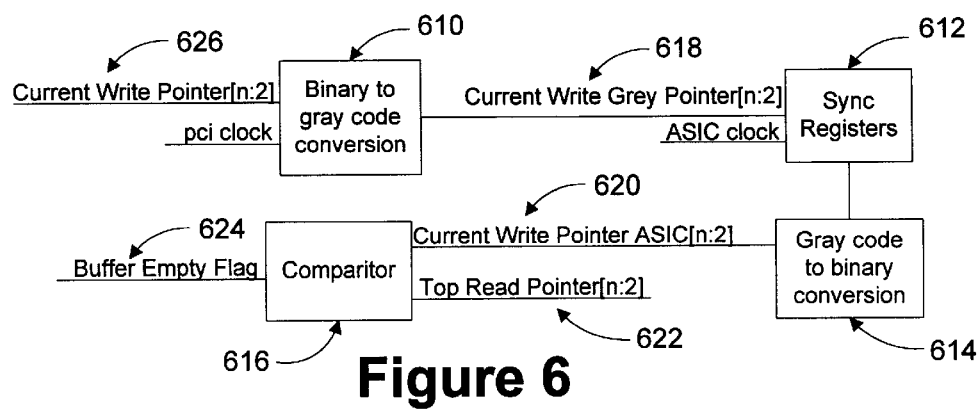
FIG. 6 is a diagram illustrating the operation of a synchronization interface in accord with an embodiment of the present invention.

Referring now to FIG. 6, bits two through n of current write pointer 626 are converted from binary to gray code and go through deglitch logic, step 610, to generate current write gray pointer 618. The gray code conversion and deglitch logic prevent multiple bits of current write pointer 626 from changing state while being read under the ASIC clock domain, preventing false values from being clocked across the synchronization boundary.

Current write gray pointer 618 is then synchronized to the ASIC clock domain, step 612, and converted from gray code back into binary, step 614, to generate current write pointer ASIC 620. Finally, current write pointer ASIC 620 is compared to top read pointer 622, step 616, to generate the condition of buffer empty flag 624 as described above. Table 2 below lists pseudo code for performing steps 610, 614 and 616.

TABLE 2

| STEP | PSUEDO CODE |
|---|---|
| binary to gray code conversion, step 610 | for (i=n; i>=2; i=i−1) begin<br>if(i==n) CurrentWriteGrayPointer[i] = CurrentWritePointer[i];<br>else CurrentWriteGrayPointer[i] = CurrentWritePointer [i+1]^CurrentWritePointer[i];<br>end |
| gray code to binary conversion, step 614 | for (i=n; i>=2; i=i−1) begin<br>if(i==n) CurrentWritePointerASIC[i] = CurrentWriteGrayPointer[i];<br>else CurrentWritePointerASIC[i] = CurrentWritePointerASIC[i+1]^CurrentWriteGrayPointer[i];<br>end |
| setting buffer empty flag, step 616 | BufferEmpty = (CurrentWritePointerASIC[n:2] == TopReadPointer[n:2]); |

It is important that the computation of buffer empty flag 624 is done under the ASIC clock domain for two reasons. First buffer empty flag 624 is utilized by network side interface 134 which runs under the ASIC clock domain, so access by network side interface 134 to buffer empty flag 624 will be synchronized with the update of buffer empty flag 624. Second, if current write pointer 616 is in the process of being incremented by host side interface 132, the process of converting current write pointer 616 to gray code, step 610, and synchronizing to the ASIC clock domain, step 612, will result in current write pointer ASIC 620 having either the value of current write pointer 616 before being incremented or after being incremented depending on the synchronization boundary of the ASIC and pci clocks. The result on buffer empty flag 624 is that it may continue to indicate that the buffer is empty for one or multiple ASIC clock cycles, until host side interface 132 has finished incrementing current write pointer 616.

End of Packet Flag

The end of packet flag is used by network side interface 134 to determine when the last byte of a frame has been read and transmitted over network 118. The end of packet flag is set when top read pointer 222 equals top end of packet pointer 224 and top frame 230 is not dynamic. If top frame 230 is dynamic the end of packet flag will not be set since top frame 230 is still being written to buffer memory 120, and the end of packet has not been reached. Psuedo code for setting the end of packet flag is shown in table 3 below.

TABLE 3

| FLAG | PSUEDO CODE |
|---|---|
| End of Packet | EndofPacket = (TopEndofPacketPointer[n:0] == TopReadPointer[n:0]) & (not dynamic) |

Reclaim Flag, Buffer Full Flag and Buffer Free Calculation

Figure 7:
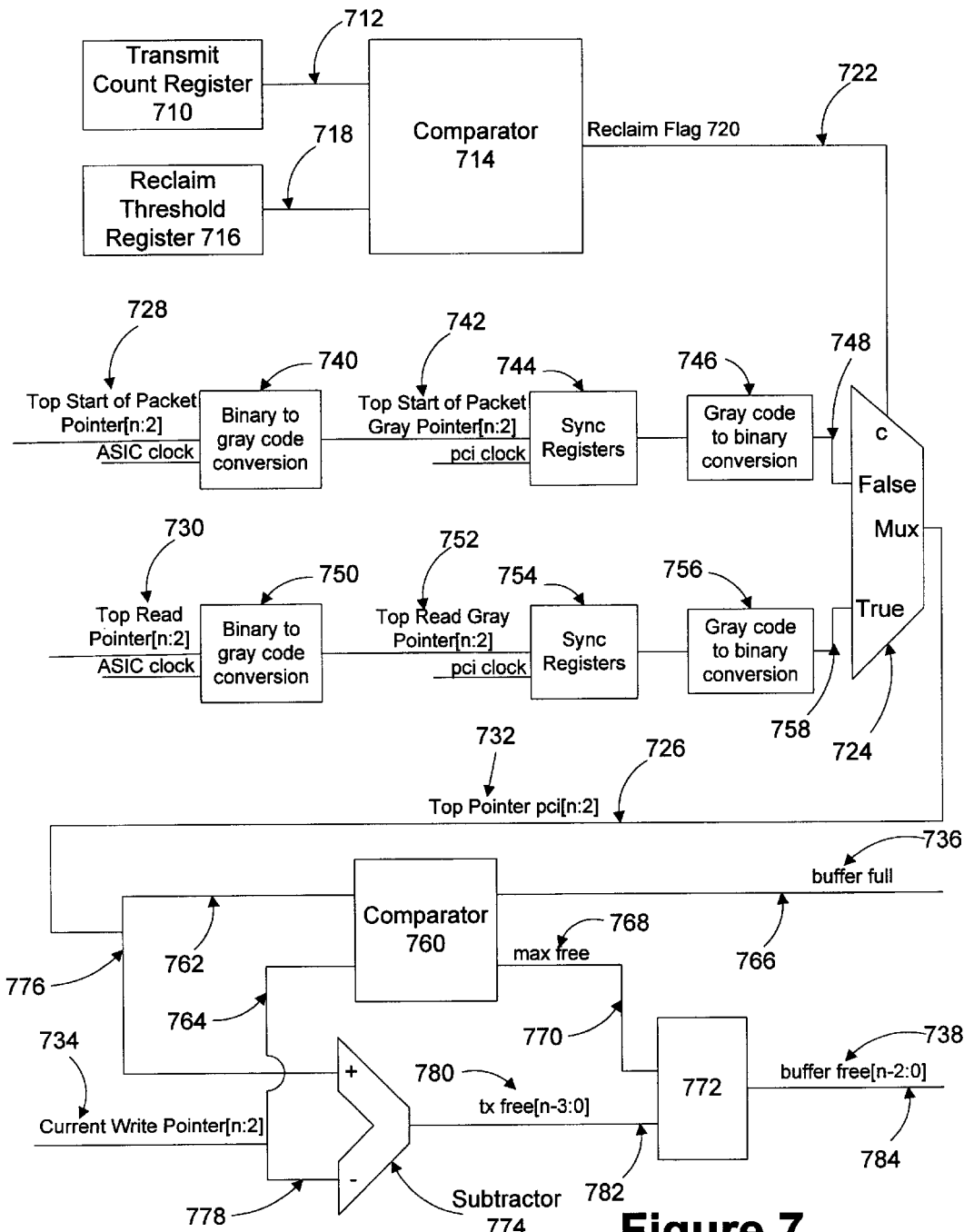
FIG. 7 is a diagram illustrating the computation of a reclaim flag, buffer full flag and buffer free value in accord with an embodiment of the present invention.

Referring now to FIG. 7 an illustration of the calculation of reclaim flag 720, buffer full flag 736 and buffer free value 738 is shown. Reclaim flag 720 indicates whether memory used by transmitted data in top frame 230 has been reclaimed for storage of new data, buffer full flag 736 indicates when memory 120 becomes full, and buffer free value 738 indicates the number of free dwords in memory 120.

The transmit count value, contained in transmit count register 710 is input on line 712 to comparator 714. The reclaim threshold value, contained in reclaim threshold register 716 is input on line 718 to comparator 714. Comparator 718 compares the transmit count value to the reclaim threshold value and outputs reclaim flag 720 on line 722. The value of reclaim flag 720 is true if the transmit count value is greater than the reclaim threshold value, indicating that the buffer memory containing transmitted bytes of top frame 230 are reclaimed. Otherwise reclaim flag 720 is set false to indicate that the buffer memory containing transmitted bytes of top frame 230 has not yet been reclaimed.

Reclaim flag 720 is input on line 722 as the control bit to mux 724. The output of mux 724 on line 726 is either top start of packet pointer 728, if reclaim flag 720 is false, or top read pointer 730, if reclaim flag is true. Before being input to mux 724, top start of packet pointer 728 and top read pointer 730 are converted to the pci clock domain. Conversion is necessary so that top pointer pci 732 output from mux 724 can be compared with current write pointer 734 to generate buffer full flag 736 and buffer free value 738.

Top start of packet pointer 728 is converted into gray code, step 740, to generate top start of packet gray pointer 742. Top start of packet gray pointer is then synchronized to the pci clock domain, step 744, and converted from gray code back to binary, step 746 before being input to mux 724 on line 748.

Similarly top read pointer 730 is converted into gray code, step 750, to generate top read gray pointer 752. Top read gray pointer 752 is then synchronized to the pci clock domain, step 754, and converted from gray code back to binary, step 756 before being input to mux 724 on line 758.

Top pointer pci 732 output from mux 724 on line 726 is input to comparator 760 on line 762. Current write pointer 734 is input to comparator 760 on line 764. Comparator 760 compares top pointer pci 732 to current write pointer 734 to generate buffer full flag 736 on line 766 and max free flag 768 on line 770. Buffer full flag 736 is set true by comparator 760 when bits two through n−1 of top pointer pci 732 equal bits two through n−1 of current write pointer 734, i.e. top pointer pci 732 points to the same dword as current write pointer 734, and bit n of top pointer pci 732 is not equal to bit n of current write pointer 734.

Max free flag 768 output from comparator 760 is true when bits two through n of top pointer pci 732 are equal to bits two through n of current write pointer 734, i.e. the buffer is empty. Max free flag 768 is input to element 772 on line 770 and used to generate buffer free value 738.

Buffer free value 738 is an n−1 bit number representing the number of dwords of memory which are available for writing new data. To generate buffer free value 738, bits two through n−1 of top pointer pci 732 are input to subtractor 774 on line 776, and bits two through n−1 of current write pointer 734 are input to subtractor 774 on line 778. Subtractor 774 subtracts the n−2 bit current write pointer 734 from the n−2 bit top pointer pci 732 to generate tx free value 780 on line 782. So long as buffer memory 120 is not empty, tx free value 780 will represent the number of dwords of memory 120 which are available for writing new data. If buffer memory 120 is empty, however, top pointer pci 732 will equal current write pointer 734 and tx free value will be zero.

In order to generate buffer free value 738 max free flag 768 is input on line 770 to element 772, and tx free value 780 is input on line 782 to element 772. Element 772 adds max free flag 768 to tx free value 780 to create buffer free value 738 on output on line 784. Buffer free value 738 is a n-I bit binary number, where bit n−1 is given by the value of max free flag 768, and bits n−2 through zero are given by tx free value 780. Thus in all cases, buffer free value 738 represents the number of dwords available for writing new data.

Table 4 below lists pseudo code for performing steps 740, 746, 750, 756.

TABLE 4

| STEP | PSEUDO CODE |
|---|---|
| binary to gray code conversion, step 740 | for (i=n; i>=2; i=i−1) begin<br>if(i==n) TopStartofPacketGrayPointer[i] = TopStartofPacketPointer[i];<br>else TopStartofPacketGrayPointer[i] = TopStartofPacketPointer[i+1]^TopStartofPacketPointer[i];<br>end |
| gray code to binary conversion, step 746 | for (i=n; i>=2; i=i−1) begin<br>if(i==n) TopStartofPacketPointerPCI[i] = TopStartofPacketGrayPointer[i];<br>else TopStartofPacketPointerPCI[i] = TopStartofPacketPointerPCI[i+1]^TopStartofPacketGrayPointer[i];<br>end |
| binary to gray code conversion, step 750 | for (i=n; i>=2; i=i−1) begin<br>if(i==n) TopReadGrayPointer[i] = TopReadPointer[i];<br>else TopReadPointer[i] = TopReadPointer[i+1]^TopReadPointer[i];<br>end |
| gray code to binary conversion, step 756 | for (i=n; i>=2; i=i−1) begin<br>if(i==n) TopReadPointerPCI[i] = TopReadGrayPointer[i];<br>elseTopReadPointerPCI[i] = TopReadPointerPCI[i+1]^TopReadGrayPointer[i];<br>end |

Table 5 below lists pseudo code for calculating reclaim flag 720, buffer full flag 736, max free flag 768, tx free value 780, and buffer free value 738.

TABLE 5

| FLAG/VALUE | PSEUDO CODE |
|---|---|
| reclaim flag, 720 | Reclaim = (TransmitCountValue > ReclaimThresholdValue) |
| buffer full flag, 736 | BufferFull = (TopPointerPci[n] != CurrentWriterPointer[n]) & (TopPointerPci[n−1:2] == CurrentWritePointer[n−1:2]) |
| max free flag, 768 | MaxFree = (TopPointerPci[n:2] == CurrentWritePointer[n:2]) |
| tx free value, 780 | TxFree[n−3:0] = (TopPointerPci[n−1:2] − CurrentWritePointer[n−1:2]) |
| buffer free value, 738 | BufferFree[n−2:0] = {MaxFree, TxFree[n−3:0]} |

The foregoing description of a preferred embodiment of the invention has been presented for purposes of illustration and description. It is not intended to limit the invention to the precise forms disclosed. Many modifications and variations will be apparent to practitioners skilled in the art. It is intended that the scope of the invention be defined by the following claims and their equivalents.

What is claimed is:

1. An asynchronous transmit packet buffer device for transferring frame data among hosts and networks comprising:

a dual-ported memory;

a logic device including a first interface clocked at a first speed coupled between the dual-ported memory and a host and a second interface clocked at a second speed coupled between the dual-ported memory and a network, the logic device controlling simultaneous transfer of frame data into the memory at a first clock speed and from the memory at a second clock speed; and a synchronization interface coupled between the first and second interface to synchronize address pointers that are being read and written simultaneously at the first and second clock speeds;

wherein after transmission of a first portion of a frame, the memory containing the first portion of a frame is reclaimed for storage of new data prior to complete frame transmission.

2. The device of claim 1, wherein a size of the first portion of a frame is such that a minimum time required to transmit the first portion is greater than an expected maximum time for determining whether a data collision has occurred.

3. The device of claim 2, wherein the memory containing a second portion of a frame is reclaimed continuously as the data contained in the second portion of a frame is transmitted.

4. The device of claim 3, wherein data is downloaded continuously into the memory.

5. The device of claim 1, wherein multiple frames are simultaneously stored in the memory.

6. The device of claim 1, wherein a length of the frames is variable and a size of the frames is smaller than the memory size.

7. The device of claim 6, wherein a header is attached to each frame, the header including a flag indicating a current status of the frame, the status being either dynamic indicating the frame is currently being downloaded into memory, or static indicating the frame has been completely downloaded into the memory; and wherein the flag is initially set to indicate a dynamic frame and upon completely downloading the frame, the flag is set to indicate a static frame and an address of an end of the frame is stored in the header.

8. The device of claim 7, wherein transmission of a frame can begin before the frame has been completely downloaded into the memory.

9. The device of claim 1, wherein a length of the frames is variable and a size of the frames is greater than a size of the memory.

10. The device of claim 2, wherein the memory containing a non-reclaimed portion of the frame is continuously reclaimed as the data contained in the non-reclaimed portion is transmitted.

11. The device of claim 7, wherein downloading of a frame begins before the host has finished constructing or receiving the frame.

12. The device of claim 1, wherein the first interface clocked at a first speed includes a host interface synchronously clocked with the host.

13. The device of claim 1, wherein the second interface clocked at a second speed includes a network interface synchronously clocked with the network.

14. The device of claim 1, further comprising a plurality of registers coupled to the logic device by at least one data bus for storing address pointers to locations in the memory.

15. The device of claim 1, wherein the synchronization interface controls synchronization of host-side interface data received through a host interface bus coupling the first interface to the synchronization interface and network-side interface data received through a network interface bus coupling the second interface to the synchronization interface.

16. A computer readable medium containing executable instructions which, when executed in a processing system, causes the system to asynchronously transfer frame data among hosts and networks, the asynchronous transfer comprising:

controlling an asynchronous transmit packet buffer to simultaneously transfer frame data into a dual-ported memory at a first clock speed and from the dual-ported memory at a second clock speed, the asynchronous transmit packet buffer comprising the dual-ported memory and a logic device including a first interface clocked at a first speed coupled between the dual-ported memory and a host and a second interface clocked at a second speed coupled between the dual-ported memory and a network;

controlling a synchronization interface coupled between the first and second interface to synchronize address pointers that are being read and written simultaneously at the first and second clock speeds, wherein after transmission of a first portion of a frame, the memory containing the first portion of a frame is reclaimed for storage of new data prior to complete frame transmission.

17. An electromagnetic medium containing executable instructions which, when executed in a processing system, causes the system to asynchronously transfer frame data among hosts and networks, the asynchronous transfer comprising:

controlling an asynchronous transmit packet buffer to simultaneously transfer frame data into a dual-ported memory at a first clock speed and from the dual-ported memory at a second clock speed, the asynchronous transmit packet buffer comprising the dual-ported memory and a logic device including a first interface clocked at a first speed coupled between the dual-ported memory and a host and a second interface clocked at a second speed coupled between the dual-ported memory and a network;

controlling a synchronization interface coupled between the first and second interface to synchronize address pointers that are being read and written simultaneously at the first and second clock speeds, wherein after transmission of a first portion of a frame, the memory containing the first portion of a frame is reclaimed for storage of new data prior to complete frame transmission.

* * * * *